United States Patent
Puthiyedath

(12) 
(10) Patent No.: US 7,117,521 B2
(45) Date of Patent: Oct. 3, 2006

(54) METHOD TO MEASURE THE PERCEIVED QUALITY OF STREAMING MEDIA

(75) Inventor: Leena K. Puthiyedath, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 988 days.

(21) Appl. No.: 09/942,957

(22) Filed: Aug. 31, 2001

(65) Prior Publication Data

US 2003/0046032 A1   Mar. 6, 2003

(51) Int. Cl.
- H04N 7/173 (2006.01)
- H04N 17/00 (2006.01)
- G06F 15/16 (2006.01)
- H04N 7/16 (2006.01)

(52) U.S. Cl. .................... 725/107; 725/131; 725/139; 725/151; 709/219; 348/192

(58) Field of Classification Search ............... 725/107, 725/125, 131, 139, 151, 114, 144; 709/217, 709/219; 348/192
See application file for complete search history.

(56) References Cited

U.S. PATENT DOCUMENTS

| | | | | |
|---|---|---|---|---|
| 5,767,895 A | * | 6/1998 | Yashiro et al. | 725/106 |
| 6,097,699 A | * | 8/2000 | Chen et al. | 370/231 |
| 6,629,318 B1 | * | 9/2003 | Radha et al. | 725/134 |
| 2002/0120727 A1 | * | 8/2002 | Curley et al. | 709/223 |

* cited by examiner

*Primary Examiner*—Chris Kelley
*Assistant Examiner*—Joseph G. Ustaris
(74) *Attorney, Agent, or Firm*—Pillsbury Winthrop Shaw Pittman LLP

(57) ABSTRACT

A method and system of analyzing the perceived quality of streaming media that includes transmitting at least one data packet from a stream sender to a stream receiver via a network connection; analyzing the data packets at the stream receiver, where the stream receiver determines whether there are data packets missing from the stream sender's data packets; requesting retransmission of specific data packets missing from the stream receiver; and retransmitting at least one specific data packet missing from the stream sender to the stream receiver.

19 Claims, 4 Drawing Sheets

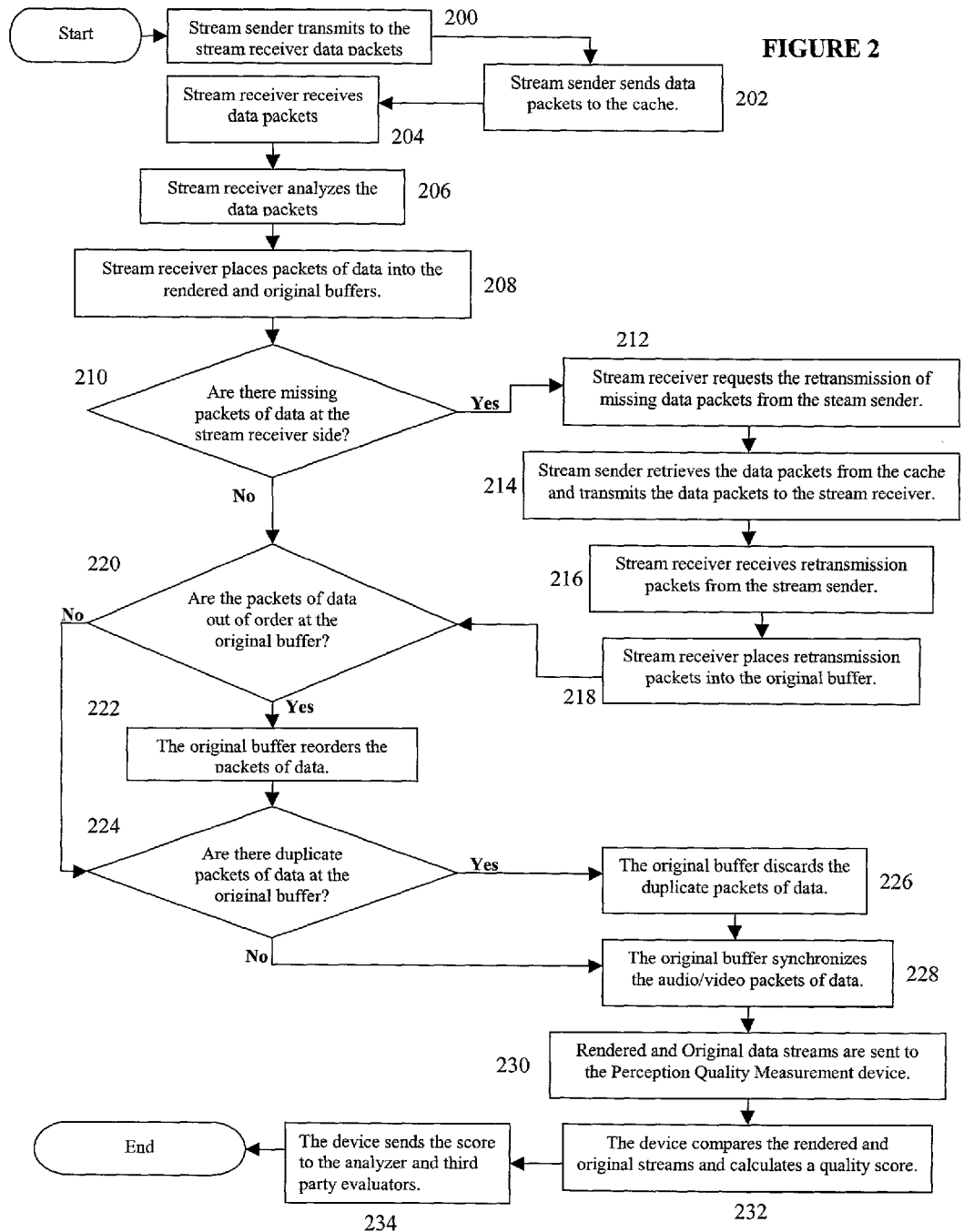

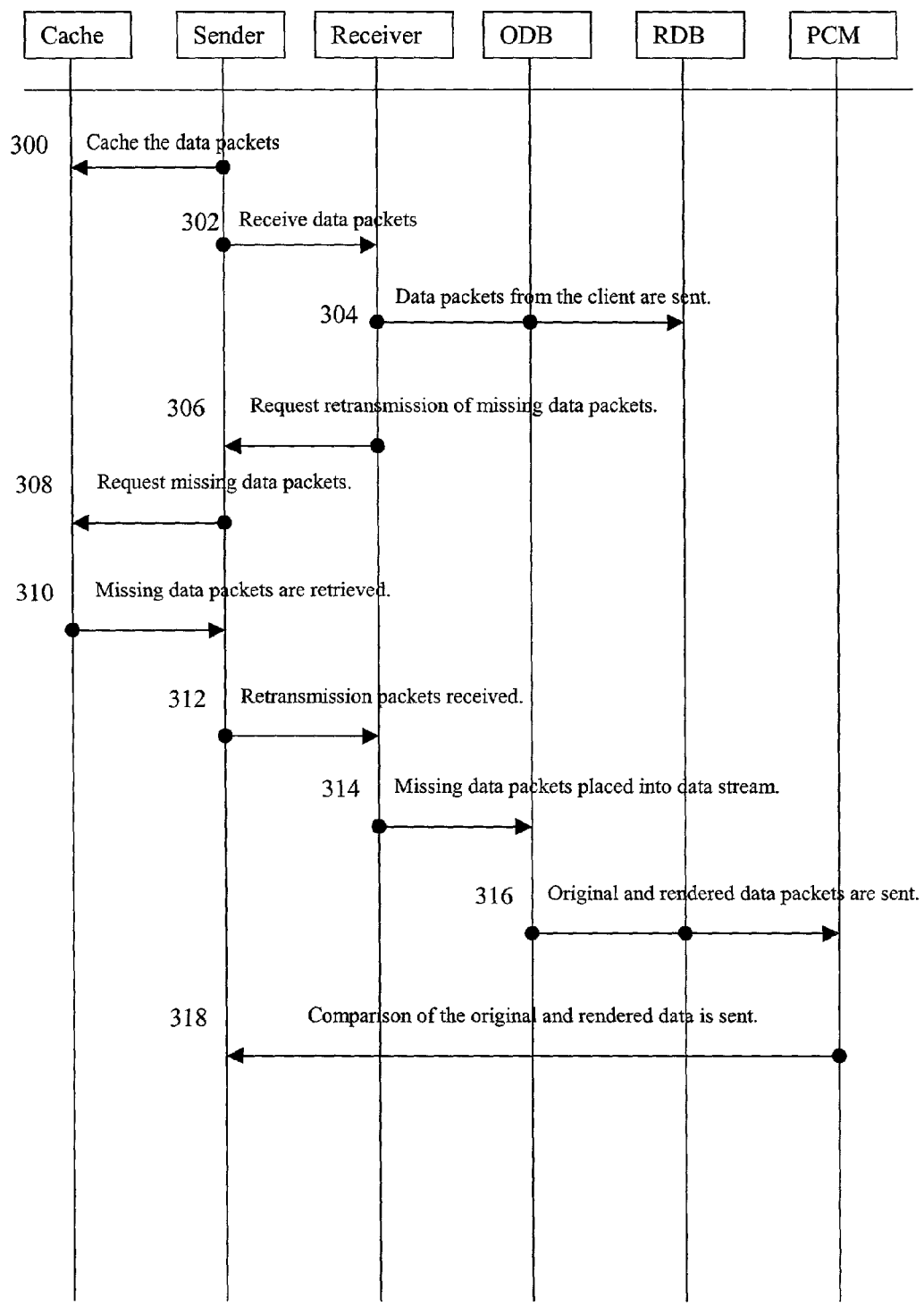

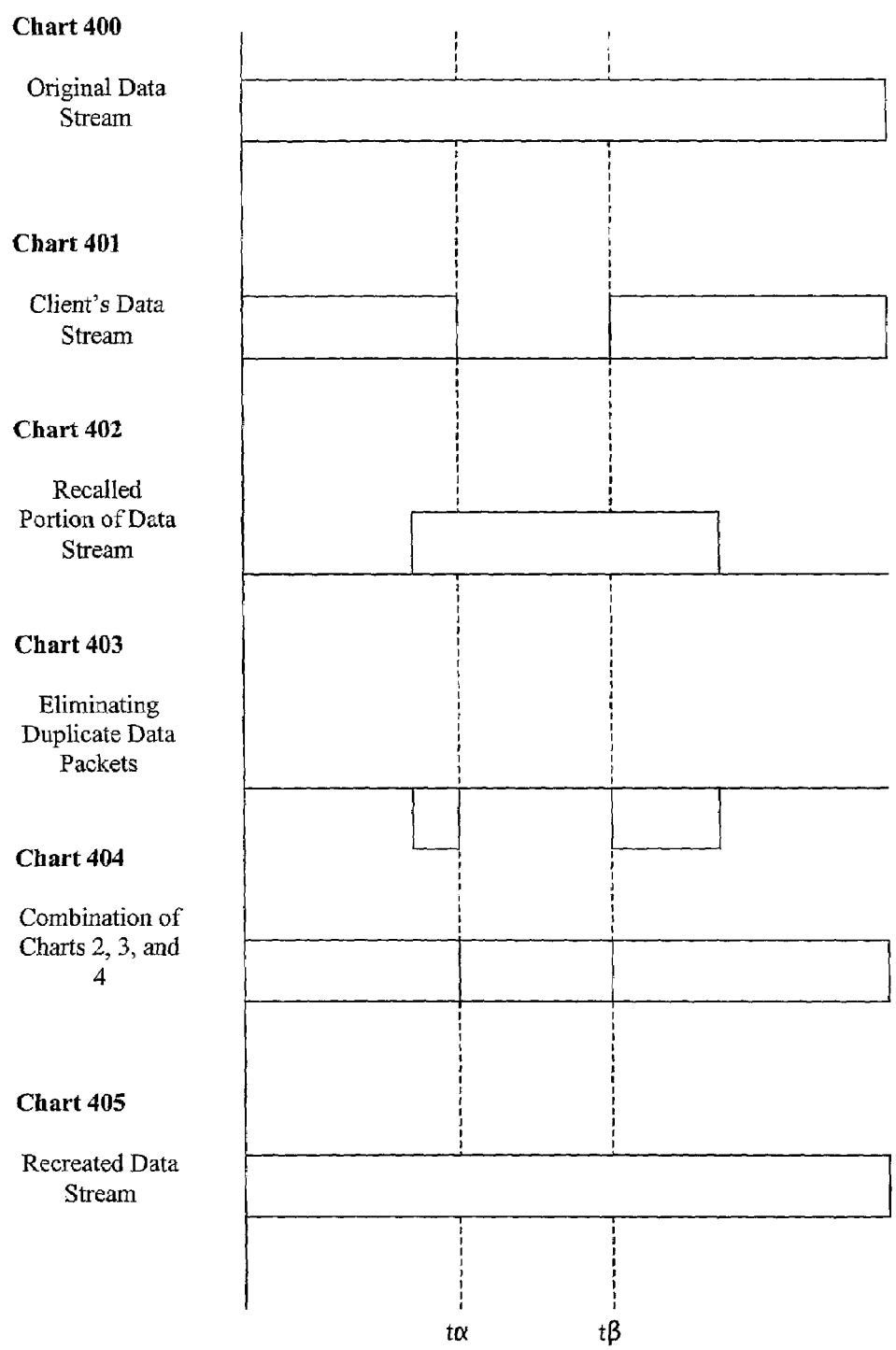

METHOD TO MEASURE THE PERCEIVED QUALITY OF STREAMING MEDIA

RESERVATION OF COPYRIGHT

This patent document contains information subject to copyright protection. The copyright owner has no objection to the facsimile reproduction by anyone of the patent document or the patent, as it appears in the U.S. Patent and Trademark Office files or records, but otherwise reserves all copyright rights whatsoever.

BACKGROUND OF THE INVENTION

1. Field of the Invention

The present invention, in certain respects, relates to streaming media. In other respects, the present invention relates to a method of analyzing the perceived quality of streaming media.

2. Description of Background Information

The popularity and demand for Streaming Media Content on the Internet has increased the need to measure the quality of streaming media (data streams) at the receiving end of a data stream (stream receiver). Data streams comprise information arranged in data packets. Content developers, who use the services of content delivery networks, expect the best quality of multimedia (audio, video et al.) data packets possible to be delivered at the stream receiver. The content delivery networks, in turn, attempt to improve the delivery of data packets to the stream receiver for a fee. Quantitative measurements of the end user's perceived quality of the Streaming Media content will help in the attempt to provide the best quality of data packets.

Perceived quality measurements require a comparison of the original data stream with the data stream at the stream receiver. It is the nature of a content delivery network that at any end, only one version of a particular stream is available at any given time, the original data stream at the stream sender or the rendered data stream at the stream receiver. To enable measurement at any one end, one of the data streams must be recreated. For example, if a measurement is taken at the stream sender, then the rendered data stream would need to be recreated.

However, a disadvantage of obtaining the perceived quality measurement of the rendered data stream at the stream sender is that the quality score would only be available to the streaming content service provider. Since the measurements require highly intense computation, the processing capacity at the stream sender would need to be scaled for each stream receiver whose perceived quality is being measured. Stream sender recreation also eliminates an independent third party evaluation of the perceived quality at a stream receiver. What is needed is an efficient and effective way to obtain the perceived quality measurement.

BRIEF DESCRIPTION OF THE DRAWINGS

The present invention is further described in the detailed description which follows, by reference to the noted drawings by way of non-limiting exemplary embodiments, in which like reference numerals represent similar parts throughout the several views of the drawings, and wherein:

FIG. 2 is a flow diagram explaining the transmittal of data packets in an embodiment of the present invention;

FIG. 3 is a signaling diagram, illustrating data packet routing in an embodiment of the invention; and FIG. 4 illustrates the recreation of the original data stream in the original data buffer.

DETAILED DESCRIPTION

Figure 1:
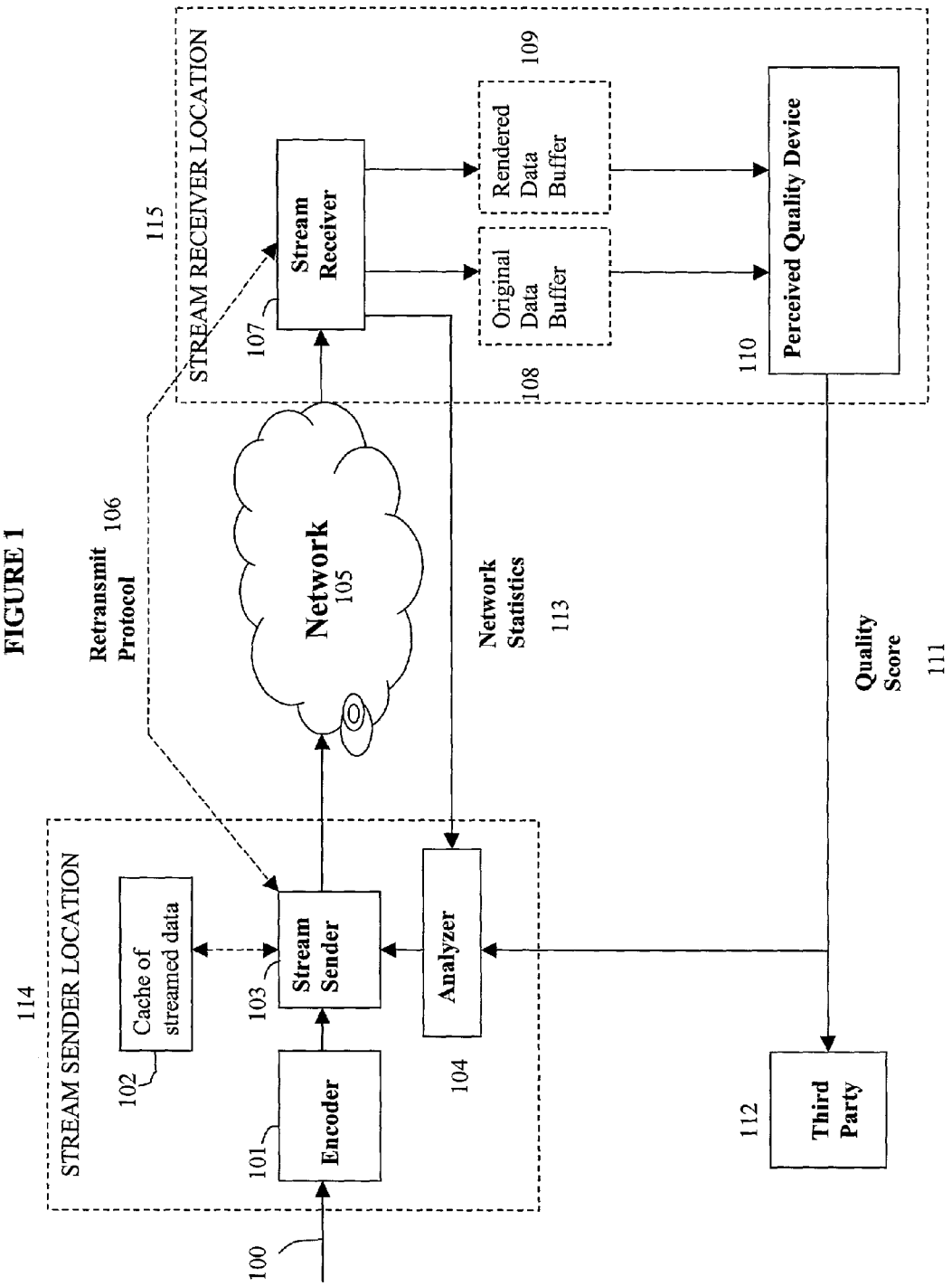
FIG. 1 illustrates a high-level system architecture of an embodiment of the present invention.

FIG. 1 illustrates a networked streaming media system that uses stream receiver side recreation to monitor the quality of the data stream viewable at the stream receiver. The illustrated system may be implemented to allow for real-time streaming such as bi-directional, bi-lateral and interactive, as in two-way and multiple way conversation. The illustrated system may include scaled versions in which more than one stream receiver may exist. The network bandwidth required to recreate the original data stream at the stream receiver may be reduced by retransmitting only the missing data packets. To incorporate the retransmission of only the missing data packets, a Retransmit protocol can be developed which can use a reliable protocol like the Transmission Control Protocol (TCP) as the underlying protocol. The retransmitted data packets may then be used to recreate the original data stream from the stream sender and may, for example, be used for stream patching and caching in a multicast environment.

FIG. 1 illustrates a high-level system architecture in which a data stream comprising a set of data packets 100 that were previously requested from a service provider (not shown) are transmitted to a stream receiver 107, at a stream receiver location 115. The data packets 100 are routed through an encoder 101, located at a stream sender location 114, where the data packets 100 are encoded. The data packets 100 are routed from encoder 101 to a stream sender 103. The stream sender 103 then routes the data packets 100 to a cache of streamed data 102, where the data packets 100 are stored into memory.

The stream sender 103 then transmits the data packets 100 via a network 105 to the stream receiver location 115. The network 105 may include WAN, LAN, Internet, Ethernet, telephone, etc. The stream receiver 107, at the stream receiver location 115, analyzes the data packets 100 to determine whether there are any missing data packets. The stream receiver 107 routes a copy of the data packets 100 to a rendered data buffer 109 and an original data buffer 108. The rendered data buffer 109 and original data buffer 108 are used to alleviate unduly increasing network bandwidth which may be created by unnecessarily having to retransmit an entire data stream, and delay the data stream until any missing data packets may be routed into the original data buffer. When data packets 100 are transmitted over the network 105, the data packets 100 may become lost during the transmittal and never reach the requesting location. The stream receiver 107 determines if any data packets 100 are missing from the original data packets that were transmitted at the stream sender 103 using a predetermined analysis process. Each data packet may have a sequence number and timestamp information that allows the stream receiver 107 to order the data packets 100 to determine whether there are missing data packets. If data packets 100 are found to be missing, the stream receiver 107 requests a retransmittal of the specific missing data packets from the stream sender 103 using a retransmit protocol 106, via network 105. The Retransmit protocol 106 can be defined to be messages from the stream receiver 107 to a stream sender 103 requesting retransmission of data packets referred to by their Real Time Protocol (RTP) identifiers of synchronization source, sequence number and timestamp information. In response, the stream sender 103 can retransmit the RTP data packets. For reliability, the Retransmit protocol's 106 messages and data packet can be transmitted over TCP as the underlying protocol stack.

The retransmit protocol 106 communicates with the stream sender 103, at the stream sender location 114, to retransmit the specific missing data packets. The stream sender 103 requests the specific missing data packets from the cache of streamed data 102. The cache of streamed data 102 locates and then routes the specific missing data packets back to the stream sender 103. The stream sender 103, in turn, sends the specific missing data packets to the stream receiver 107, at the stream receiver location 115, using the retransmit protocol 106.

Once the stream receiver 107 receives the specific missing data packets, the stream receiver 107 routes the specific missing data packets to the original data buffer 108, where the specific missing data packets are inserted in the correct time sequencing position in the data stream at the original data buffer 108. The original data buffer 108 may conduct an editing process to reorder the received data packets to ensure proper sequencing, discard duplicated data packets, and synchronize the audio/video data packets. A suitable retransmission delay time can be used when editing the original data buffer 108 to ensure that all missing data packets are received. Once editing at the original data buffer 108 is complete, the original data buffer 108 and the rendered data buffer 109 route the entire contents of their buffer memory to a device 110 that is configured to measure the perceived quality of the data packets. The device 110 is configured to receive the incoming data streams to be time aligned. The device 110 is configured to compare the sequential data packets of the rendered data buffer 109 and original data buffer 108. If despite retransmission delay, the original data buffer 108 did not receive all missing data packets, then the comparison can be stopped at the missing data packet in the original data buffer 108. Comparison can resume from the point where the missing data is available at the original data buffer 108, ensuring that the rendered data buffer 109 is time sequence synchronized. This may cause a segment of the streamed data to not have a quality score. This could be tolerable in practice because customers often want quality scores for periodic samples of the rendered data streams instead of the whole rendered data stream.

The device 110 produces a quality score 111 as a result of comparing the contents from the rendered data buffer 109 and the original data buffer 108. The device 110 can use any standard measurement and implementation, such as Keynote's Streaming Perspective, to formulate a quality score 111. The quality score 111 may be routed to a third party evaluator 112 and an analyzer 104. A third party evaluator 112, such as Keynote, evaluates the quality score 111 in order to rate the quality of service provided to the stream receiver 107. The analyzer 104, such as CommandView's Bandwidth Optimizer, uses the quality score 111, along with, for example, network statistics data 113 to ensure conformance with established Service Level Agreements and to allocate optimal bandwidth for acceptable quality of service. Network statistics 113 can comprise of OC-3 linkage usage, router interface statistics, network segment usage, Remote Monitoring (RMON), etc.

Stream renderers often use play-back buffers to alleviate the effects of jitter and out of order arrival of data packets. The play-back buffer is similar in functionality to the original data buffer 108. Use of the play-back buffer by the renderer causes a delay in rendering. This is acceptable for rendering pre-recorded streams. For real-time streaming, for example in bi-directional and interactive, as in two-way conversation, the rendering of the received data cannot tolerate any delay.

The original data stream recreation in the original data buffer 108 also causes delay. This is acceptable because the device 110 can lag the actual rendering of the data at the stream receiver 107. The rendered data buffer 109 will store the actual data packets rendered and is unaffected by the use of the play-back buffers by the renderer.

FIG. 2 is a flow diagram explaining the transmittal of data packets in an embodiment of the present invention.

At block 200, the stream sender 103, located at the stream sender location 114, transmits the data packets to the stream receiver 107, located at the stream receiver location 115. The data packets 100 may be transmitted via a network 105 connection (LAN, WAN, Internet, telephone, etc.). At block 202, the stream sender 103 sends a copy of the data packets 100 to the cache of streamed data to store the data packets 100 into memory.

At block 204, the stream receiver 107 receives the data packets 100 from the stream sender 103. At block 206, the stream receiver 107 analyzes the data packets' 100 sequence number and timestamp information. Some of the data packets 100 may be out of sequential order or missing, due to the network 105 connection.

At block 208, the stream receiver 107 routes the data packets 100 into the rendered data buffer 109 and original data buffer 108. At this point, data packets 100 are time aligned, and if necessary, a delay is introduced for the need to address the retransmission of data packets 100.

At block 210, the stream receiver 107 uses the stream receiver's 107 analysis at block 206, to determine whether to request missing data packets. If data packets are not missing, then the process proceeds to block 220. If data packets are missing, the stream receiver 107 requests the retransmission of the specific missing data packets from the stream sender 103, as shown at block 212. At block 214, the stream sender 103 obtains the specific missing data packets from the cache 102. The cache 102 enables the retransmission of the missing data packets on request from the stream receiver 107 and routes the specific data packets to the stream receiver 107.

At block 216, the stream receiver 107 receives the retransmission of the specific missing data packets and then, at block 218, routes the missing data packets to the original data buffer 108, where the data packets are inserted into the correct time sequencing position. The original data buffer 108 enables the recreation of the original data stream of data packets transmitted by the stream sender 103.

At block 220, the original data buffer 108 decides whether the data packets are out of sequential order. If the data packets are out of sequential order, then at block 222, the original data buffer 108 reorders the data packets.

If the data packets are correctly ordered, then at block 224 the original data buffer 108 determines whether there are duplicate data packets. If duplicate data packets exist, then at block 226, the original data buffer 108 would discard the duplicate data packets.

If duplicate data packets do not exist, then at block 228 the original data buffer 108 synchronizes the audio/video data packets. Once buffering of the data packets is finished, then at block 230 the rendered and original data packets are transmitted to the device 110 that is configured to measure the perceived quality of the data packets.

At block 232, the device 110 for measuring the perceived quality of the data packets compares the individual sequential data packets from both the rendered data buffer 109 and the original data buffer 108. After the comparison is made, the device 110 calculates a quality score 111. At block 234, the device 110 sends the quality score 111 to the necessary evaluators. The quality score 111 is used as a quality metric to rate the service providers. The quality score 111 may also be used, along with the network statistics 113, to provide information to track the Service Level Agreements and to allocate optimal bandwidth over the network 105.

FIG. 3 is a signaling diagram, illustrating data packet routing in an embodiment of the invention.

In signal 300, data packets are transmitted from a stream sender to a cache of streamed data (Cache) 102 to store data packets 100. In signal 302, data packets 100 are transmitted from the stream sender 103 to the stream receiver 107, via a network 105 connection. Some of the data packets 100 transmitted by the stream sender 103 may be lost at the stream receiver 107, due to the network 105. In signal 304, the data packets received at the stream receiver 107 are routed to both the original data buffer 108 (ODB) and the rendered data buffer 109 (RDB). The original data buffer 108 is set up to recreate the original sequence of data packets 100 that were transmitted by the stream sender 103. The rendered data buffer 109 is set up to hold the data packets originally received at the stream receiver 107. If there are missing data packets, the stream receiver 107 would request retransmission of specific missing data packets from the stream sender 103, as shown in signal 306. In signal 308, the stream sender 103 requests the specific missing data packets from the cache. In signal 310, the cache retrieves the specific missing data packets and routes the packets back to the stream sender 103. In signal 312, the stream sender 103 retransmits the specific missing data packets to the stream receiver 107. In signal 314, the stream receiver 107 routes the specific missing data packets to the original data buffer 108. The original data buffer 108 uses the specific missing data packets to fill in the missing areas of the data stream received in the buffer, in signal 310, to recreate the original data stream transmitted from the stream sender 103 in signal 300. In signal 316, the original data buffer 108 routes the recreated original data stream of data packets, and rendered data buffer 109 routes the rendered data stream of data packets (stream of data packets received at the buffer in signal 304) to the device 110 for measuring perceived quality of the data packets. The original data buffer 108 and the rendered data buffer 109 are time aligned. The device 110 configured to measure perceived quality is set up to compare the contents of the rendered data buffer 109 and original data buffer 108 each data packet sequentially. If despite retransmission delay, the original data buffer 108 did not receive all of the missing data packets, then the comparison can be stopped at the missing packet in the original data buffer 108. Comparison can resume from the point where data is available again in the original data buffer 108, ensuring again that rendered data buffer 109 is time sequence synchronized. The device 110 for measuring perceived quality of the data packets compares the two data streams of data packets to formulate a quality score 111. In signal 318, the device 110 for measuring perceived quality of data packets routes the quality score 111 to the stream sender 103. The stream sender 103 analyzes the quality score 111 to decide whether to allocate additional bandwidth for acceptable quality of service.

FIG. 4 illustrates the recreation of the original data stream in the original data buffer 108.

The original data buffer 108 may recreate the original data stream of data packets from the stream sender 103, as shown in chart 400. The original data buffer 108 receives the data packets from the stream receiver 107, as shown in chart 401. However, at chart 401, data packets are missing from time $t\alpha$ to $t\beta$. The stream receiver 107 requests the retransmission of the specific missing data packets from time $t\alpha$ to $t\beta$. The stream receiver 107 may receive more data packets than it requested, as shown in chart 402. The stream receiver 107 routes the requested data packets to the original data buffer 108. In chart 403, the original data buffer 108 eliminates the duplicate data packets and keeps the data packets from time $t\alpha$ to $t\beta$. The original data buffer 108 integrates the data packets from time $t\alpha$ to $t\beta$ into the data packets received in chart 401 to form the recreated original data stream. The recreated data stream, as shown in chart 405, matches the original data stream in chart 400.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and, materials such as are within the scope of the appended claims.

What is claimed is:

1. A method comprising:
    transmitting a data stream of data packets having a known arrangement from a stream sender to a stream receiver via a network connection;
    storing the data stream of data packets into both an original data buffer and a rendered data buffer;
    analyzing the transmitted data packets received at the stream receiver and stored in the original data buffer to determine whether any missing known data packets in the known data packet arrangement were not received by the stream receiver;
    requesting the stream sender to retransmit any missing known data packets not received at the stream receiver;
    retransmitting any missing known data packets from the stream sender to the stream receiver;
    comparing, recreated data packets at the original data buffer to the data packets stored at the rendered data buffer to form a perceived quality of streaming data score, the recreated data packets including the any missing known data packets and the data stream of data packets; and sending the perceived quality of streaming data score to a third party for evaluation purposes.

2. The method of claim 1, wherein the rendered data buffer delays transmitting the stored data packets until the missing known data packets are integrated into the data packets stored at the original data buffer.

3. The method of claim 1, wherein the third party evaluates the perceived quality of streaming data score to track the Service Level Agreements at the stream receiver.

4. The method of claim 1, further including sending the perceived quality of streaming data score is sent to an analyzer and the analyzer evaluates the perceived quality of streaming data score to allocate sufficient bandwidth to provide acceptable quality of service to the stream receiver.

5. A system comprising:
    a stream sender configured to transmit a data stream of data packets having a known arrangement via a network connection;
    a stream receiver to receive the data stream of data packets, to copy the data stream of data packets to an original data buffer and a rendered data buffer, and to analyze the transmitted data stream of data packets received from the stream sender to determine whether any missing known data packets in the known data packet arrangement were not received by the stream receiver, the stream receiver also including a retransmit protocol configured to allow the stream receiver to request the stream sender to retransmit any missing known data packets not received at the stream receiver and the stream sender to retransmit any missing knows data packets to the stream receiver; and a device configured to form a perceptual quality measurement score based on the original data buffer and the rendered data buffer.

6. The system of claim 5, wherein the stream receiver is configured to analyze by comparing the received data packets with the known arrangement of data packets.

7. The system of claim 5, wherein the original data buffer recreates the data packets transmitted from the stream sender, using a recreation process that includes at least one of the following:
 (1) reordering out of sequence data packets;
 (2) discarding duplicate data packets; or
 (3) synchronizing audio and video data packets.

8. The system of claim 5, wherein the device transmits the perceptual quality measurement score to an analyzer and the analyzer analyzes the perceptual quality measurement score to allocate sufficient bandwidth to provide acceptable quality of service to the stream receiver.

9. The system of claim 5, wherein the device transmits the perceptual quality measurement score to a third party evaluator and the third party evaluator analyzes the perceptual quality measurement score to track meeting Service Level Agreements at the stream receiver.

10. The system of claim 5, the system further includes
 a plurality of stream sender locations;
 a plurality of stream receiver locations; and
 a plurality of third party evaluators,
 wherein the plurality of stream sender locations and the plurality of stream receiver locations are configured to form the perceptual quality measurement score.

11. The system of claim 10, wherein the plurality of stream sender locations and the plurality of stream receiver locations are configured for multicasting.

12. The system of claim 10, wherein the plurality of stream sender locations and stream receiver locations are configured for conversation with any number of stream sender locations and stream receiver locations.

13. A computer readable medium encoded with a program, which when executed, causes a computing device to:
 receive a data stream of data packets having a known arrangement at a stream receiver from a stream sender via a network connection;
 store the data stream of data packets into both an original data buffer and a rendered data buffer;
 analyze the transmitted data packets received at the stream receiver and stored in the original data buffer to determine whether any missing known data packets in the known data packet arrangement were not transmitted received by the stream receiver;
 request the stream sender to retransmit any missing known data packets not received at the stream receiver;
 compare recreated data packets at the original data buffer to the data packets stored at the rendered data buffer to form a perceived quality of streaming data score, the recreated data packets including the any missing known data packets and the data stream of data packets; and
 send the perceived quality of streaming data score to a third party for evaluation purposes.

14. The medium of claim 13, wherein the rendered data buffer delays the stored data packets until the missing known data packets are integrated into the data packets stored at the original data buffer.

15. The medium of claim 13, wherein the third party evaluates the perceived quality of streaming data score to track the Service Level Agreements at the stream receiver.

16. The medium of claim 13, including instructions which when executed cause the computing device to transmit the perceived quality of streaming data score to an analyzer for evaluation of bandwidth to provide acceptable quality of service at the stream receiver.

17. A method, comprising:
 receiving, at a stream receiver, a data stream of data packets, from a stream sender via a network connection;
 analyzing, at the stream receiver, the data stream of data packets by comparing the received data stream of data packets to a known arrangement of packets to determine if there are any missing packets in the data stream of data packets;
 storing the received data stream of data packets into both an original data buffer and a rendered data buffer;
 requesting the stream sender to retransmit the missing known data packets not received at the stream receiver;
 receiving the requested missing known data packets from the stream sender at the stream receiver;
 comparing recreated data stream of data packets stored in the original data buffer to the data stream of data packets stored at the rendered data buffer to generate a perceived quality of streaming data score, the recreated data steam of data packets including the missing known data packets; and sending the perceived quality of streaming data score to a third party for evaluation purposes.

18. The method of claim 17, further including sending the perceived quality of streaming data score to an analyzer for evaluation of bandwidth between the stream sender and the stream receiver.

19. The method of claim 17, wherein the rendered data buffer delays the stored data packets until the missing known data packets are integrated into the data packets stored at the original data buffer.

* * * * *